United States Patent
Tsai et al.

(10) Patent No.: US 8,055,663 B2
(45) Date of Patent: Nov. 8, 2011

(54) SYSTEMS AND METHODS FOR MEASURING BEHAVIOR CHARACTERISTICS

(75) Inventors: Tse-Ming Tsai, Taipei (TW); Chia-Chun Shih, Taipei (TW)

(73) Assignee: Institute for Information Industry, Taipei (TW)

( * ) Notice: Subject to any disclaimer, the term of this patent is extended or adjusted under 35 U.S.C. 154(b) by 1060 days.

(21) Appl. No.: 11/641,705

(22) Filed: Dec. 20, 2006

(65) Prior Publication Data

US 2008/0103721 A1 May 1, 2008

(30) Foreign Application Priority Data

Oct. 30, 2006 (TW) ................................ 95140026 A

(51) Int. Cl.
  *G06F 7/00* (2006.01)
  *G06F 17/30* (2006.01)
  *G09B 19/00* (2006.01)
(52) U.S. Cl. ........ 707/749; 434/236; 707/734; 707/736; 707/748; 707/750; 707/751
(58) Field of Classification Search .................. 434/236; 707/5, 7, 102, 513, 514, 531, 734, 748–751
See application file for complete search history.

(56) References Cited

U.S. PATENT DOCUMENTS

| | | | | |
|---|---|---|---|---|
| 5,243,520 A * | 9/1993 | Jacobs et al. | ...................... | 704/9 |
| 5,675,707 A * | 10/1997 | Gorin et al. | .................... | 704/257 |
| 5,991,710 A * | 11/1999 | Papineni et al. | .................. | 704/2 |
| 6,006,221 A * | 12/1999 | Liddy et al. | ............ | 707/999.005 |
| 6,112,202 A * | 8/2000 | Kleinberg | .......................... | 707/5 |
| 6,112,203 A * | 8/2000 | Bharat et al. | ........... | 707/999.003 |
| 6,122,647 A * | 9/2000 | Horowitz et al. | ............. | 715/205 |
| 6,167,397 A * | 12/2000 | Jacobson et al. | ....... | 707/999.005 |
| 6,285,999 B1 * | 9/2001 | Page | ................................ | 707/5 |
| 6,321,220 B1 * | 11/2001 | Dean et al. | .................... | 707/726 |
| 6,353,825 B1 * | 3/2002 | Ponte | ..................... | 707/999.003 |
| 6,356,899 B1 * | 3/2002 | Chakrabarti et al. | .......... | 707/737 |
| 6,363,379 B1 * | 3/2002 | Jacobson et al. | ....... | 707/999.005 |
| 6,457,028 B1 * | 9/2002 | Pitkow et al. | .................. | 715/206 |
| 6,499,021 B1 * | 12/2002 | Abu-Hakima | ................... | 706/10 |
| 6,560,600 B1 * | 5/2003 | Broder | ................... | 707/999.003 |
| 6,636,862 B2 * | 10/2003 | Lundahl et al. | ......... | 707/999.101 |
| 6,658,623 B1 * | 12/2003 | Schilit et al. | ................... | 715/208 |

(Continued)

OTHER PUBLICATIONS

Llorá et al. Analyzing Trends in the Blogosphere Using Human-Centered Analysis and Visualization Tools. Presented at ICWSM (Mar. 27, 2007).*

*Primary Examiner* — Nikolai A Gishnock
(74) *Attorney, Agent, or Firm* — Birch, Stewart, Kolasch & Birch, LLP

(57) ABSTRACT

Systems and methods for measuring behavior characteristics. For at least one specific user, a first concern score for respective key terms is calculated according to use frequency of respective key terms of network content corresponding to the specific user and all users. A first relation matrix for at least one specific key term is calculated according to at least two users corresponding to respective interaction behaviors between the key terms and a type weighting corresponding to respective interaction behaviors. A first interaction score for the specific user regarding the specific key term is calculated according to the first relation matrix. A first characteristic score for the specific user regarding the specific key term is calculated according to the first concern score and the first interaction score.

17 Claims, 9 Drawing Sheets

U.S. PATENT DOCUMENTS

| | | | |
|---|---|---|---|
| 6,738,678 B1 * | 5/2004 | Bharat et al. | 700/48 |
| 6,766,316 B2 * | 7/2004 | Caudill et al. | 707/999.003 |
| 6,925,432 B2 * | 8/2005 | Lee et al. | 704/5 |
| 7,010,527 B2 | 3/2006 | Alpha | 707/749 |
| 7,028,024 B1 | 4/2006 | Kommers et al. | 707/3 |
| 7,117,206 B1 * | 10/2006 | Bharat et al. | 707/999.003 |
| 7,165,069 B1 * | 1/2007 | Kahle et al. | 707/999.01 |
| 7,216,122 B2 * | 5/2007 | Ohno | 707/999.003 |
| 7,281,005 B2 * | 10/2007 | Canright et al. | 707/999.005 |
| 7,281,022 B2 * | 10/2007 | Gruhl et al. | 707/999.104 |
| 7,386,542 B2 * | 6/2008 | Maybury et al. | 707/733 |
| 7,433,876 B2 * | 10/2008 | Spivack et al. | 707/999.002 |
| 7,493,320 B2 * | 2/2009 | Canright et al. | 707/999.005 |
| 7,523,085 B2 * | 4/2009 | Nigam et al. | 706/55 |
| 7,596,552 B2 * | 9/2009 | Levy et al. | 707/999.003 |
| 7,600,017 B2 * | 10/2009 | Holtzman et al. | 709/224 |
| 7,660,783 B2 * | 2/2010 | Reed | 707/715 |
| 7,680,812 B2 * | 3/2010 | Canright et al. | 707/999.102 |
| 7,698,640 B2 * | 4/2010 | Krieglstein | 715/700 |
| 7,716,226 B2 * | 5/2010 | Barney | 707/748 |
| 7,725,414 B2 * | 5/2010 | Nigam et al. | 706/45 |
| 7,725,565 B2 * | 5/2010 | Li et al. | 709/219 |
| 7,752,186 B2 * | 7/2010 | Abajian | 707/705 |
| 7,774,335 B1 * | 8/2010 | Scofield et al. | 707/709 |
| 7,783,639 B1 * | 8/2010 | Bharat et al. | 707/736 |
| 7,792,827 B2 * | 9/2010 | Amitay et al. | 707/726 |
| 7,831,545 B1 * | 11/2010 | Betz | 707/603 |
| 7,844,483 B2 * | 11/2010 | Arnett et al. | 705/7.31 |
| 7,844,484 B2 * | 11/2010 | Arnett et al. | 705/7.31 |
| 7,844,590 B1 * | 11/2010 | Zwicky et al. | 707/706 |
| 7,877,345 B2 * | 1/2011 | Nigam et al. | 706/55 |
| 7,885,913 B2 * | 2/2011 | Weber et al. | 706/46 |
| 7,886,024 B2 * | 2/2011 | Kelly et al. | 709/219 |
| 7,966,291 B1 * | 6/2011 | Petrovic et al. | 707/641 |
| 7,970,766 B1 * | 6/2011 | Shamsi et al. | 707/737 |
| 7,987,115 B2 * | 7/2011 | Shih et al. | 705/14.73 |
| 2002/0038350 A1 * | 3/2002 | Lambert et al. | 709/217 |
| 2002/0107858 A1 * | 8/2002 | Lundahl et al. | 707/100 |
| 2002/0116174 A1 * | 8/2002 | Lee et al. | 704/9 |
| 2002/0129014 A1 * | 9/2002 | Kim et al. | 707/5 |
| 2003/0101286 A1 * | 5/2003 | Kolluri et al. | 709/316 |
| 2003/0220912 A1 * | 11/2003 | Fain et al. | 707/3 |
| 2004/0066401 A1 * | 4/2004 | Bushey et al. | 345/744 |
| 2004/0158544 A1 * | 8/2004 | Taekman et al. | 706/45 |
| 2004/0243270 A1 * | 12/2004 | Amirthalingam | 700/128 |
| 2005/0074738 A1 * | 4/2005 | Tomlinson et al. | 434/365 |
| 2005/0171946 A1 * | 8/2005 | Maim | 707/5 |
| 2005/0177805 A1 * | 8/2005 | Lynch et al. | 715/968 |
| 2006/0020591 A1 * | 1/2006 | Kommers et al. | 707/3 |
| 2006/0026013 A1 * | 2/2006 | Kraft | 705/1 |
| 2006/0059119 A1 * | 3/2006 | Canright et al. | 707/3 |
| 2007/0088609 A1 * | 4/2007 | Reller et al. | 705/14 |
| 2007/0136248 A1 * | 6/2007 | Sarid et al. | 707/3 |
| 2008/0059451 A1 * | 3/2008 | Musgrove | 707/5 |
| 2008/0104128 A1 * | 5/2008 | Drayer et al. | 707/200 |
| 2008/0114755 A1 * | 5/2008 | Wolters et al. | 707/5 |
| 2009/0138351 A1 * | 5/2009 | Shih et al. | 705/14 |

* cited by examiner

| Behavior Characteristics / Interaction Behavior | Interest | Participation | Specialty | Popularity |
|---|---|---|---|---|
| Trackback | 0.9 | 0.6 | 0.9 | 0.6 |
| Blogroll | 0.4 | 0.7 | 0.4 | 0.7 |
| Link | 0.5 | 0.7 | 0.5 | 0.7 |
| Subscription | 0.8 | 0.5 | 0.8 | 0.5 |
| Comment | 0.4 | 0.6 | 0.4 | 0.6 |
| ...... | ...... | ...... | ...... | ...... |

|  | Travel | Taiwan | Culture |
|---|---|---|---|
| User A | 1 | 1 | 1 |
| User B |  |  |  |
| User C |  |  |  |
| User D |  | 1 | 1 |
| Total Use Frequency | 1 | 2 | 2 |

FIG. 6

| UA | UB | S | IC |
|---|---|---|---|
| B | A | Comment (0.4) | (Travel,1) (Taiwan,1) (Culture,1) |
| C | A | Trackback (0.9) | (Travel,1) (Taiwan,1) (Culture,1) |
| A | D | Link (0.5) | (Taiwan,1) (Culture,1) |

FIG. 7

| Travel | A | B | C | D |
|---|---|---|---|---|
| A | 0 | 0 | 0 | 0 |
| B | 0.4 | 0 | 0 | 0 |
| C | 0.9 | 0 | 0 | 0 |
| D | 0 | 0 | 0 | 0 |

FIG. 8A

| Taiwan | A | B | C | D |
|---|---|---|---|---|
| A | 0 | 0 | 0 | 0.5 |
| B | 0.4 | 0 | 0 | 0 |
| C | 0.9 | 0 | 0 | 0 |
| D | 0 | 0 | 0 | 0 |

FIG. 8B

| Culture | A | B | C | D |
|---|---|---|---|---|
| A | 0 | 0 | 0 | 0.5 |
| B | 0.4 | 0 | 0 | 0 |
| C | 0.9 | 0 | 0 | 0 |
| D | 0 | 0 | 0 | 0 |

FIG. 8C

|  | $G_U$ | $H_U$ $A_U$ | Interest Specialty |
|---|---|---|---|
| User A | (1.73, 0.87, 0.87) | (0,0,0) | (1.73, 0.87, 0.87) |
|  |  | (1,1,1) | (2.23, 1.37, 1.37) |
| User B | (0,0,0) | (1,1,0) | (0.5, 0.5, 0) |
|  |  | (0,0,0) | (0,0,0) |
| User C | (0,0,0) | (2.25, 2.25, 1) | (1.13, 1.13, 0.5) |
|  |  | (0,0,0) | (0,0,0) |
| User D | (0, 1.06, 1.06) | (0,0,0) | (0, 1.06, 1.06) |
|  |  | (0,0,0) | (0, 1.06, 1.06) |

FIG. 9

SYSTEMS AND METHODS FOR MEASURING BEHAVIOR CHARACTERISTICS

BACKGROUND OF THE INVENTION

1. Field of the Invention

The disclosure relates generally to measurement of behavior characteristics, and, more particularly to systems and methods that measure behavior characteristics of users according to semantics and interaction behaviors.

2. Description of the Related Art

With the expansion of the Internet, applications developed for users allow browsing and posting of comments via BBSs (Bulletin Board Systems). Users can publish articles via a specific web site or a dedicated web page. Currently, blog (web log) applications are popular, whereon user-owners can publish material, in addition to referencing material on other users' blogs. In such way, interaction behaviors between different users and/or articles are generated, implying behavior characteristics of users.

To strengthen loyalty and provide various enhanced services, service providers try to explore behavior characteristics of users from network content. US Application 2005/0108281 A1 analyzes email content in enterprises according to semantic hints using NLP (Nature Language Process) technology to recognize domain experts. In US Application 2006/0053156 A1, interested and trustworthy experts are recognized according to publications and comment records toward to specific articles in enterprise article databases. These methods, since only semantics of email content or behavior records of users are analyzed, can be applied to an open network environment such as blog environment having a large number of interaction behaviors. Additionally, since only related experts are recognized, behavior characteristics of users, such as personal interests, specialty, and other individual characteristics still cannot be explored from network content for service providers to develop related enhanced applications for users.

BRIEF SUMMARY OF THE INVENTION

Systems and methods for measuring behavior characteristics are provided.

An embodiment of a system for measuring behavior characteristics comprises a database and a processing module. The database stores network content for a plurality of users, where the network content comprises a plurality of key terms and a plurality of interaction behaviors therebetween. For at least one specific user, the processing module calculates a first concern score for respective key terms according to use frequency of respective key terms corresponding to the specific user and use frequency of respective key terms corresponding to all users. The processing module calculates a first relation matrix for at least one specific key term according to at least two users corresponding to respective interaction behaviors and a type weighting corresponding to respective interaction behaviors. The processing module uses an algorithm to calculate a first interaction score for the specific user regarding the specific key term according to the first relation matrix. The processing module calculates a first characteristic score for the specific user regarding the specific key term according to the first concern score and the first interaction score.

In an embodiment of a method for measuring behavior characteristics, a database is provided. The database stores network content for a plurality of users, where the network content comprises a plurality of key terms, and a plurality of interaction behaviors therebetween. For at least one specific user, a first concern score for respective key terms is calculated according to use frequency of respective key terms corresponding to the specific user and use frequency of respective key terms corresponding to all users. A first relation matrix for at least one specific key term is calculated according to at least two users corresponding to respective interaction behaviors and a type weighting corresponding to respective interaction behaviors. A first interaction score for the specific user regarding the specific key term is calculated according to the first relation matrix using an algorithm. A first characteristic score for the specific user regarding the specific key term is calculated according to the first concern score and the first interaction score.

Systems and methods for measuring behavior characteristics may take the form of program code embodied in a tangible media. When the program code is loaded into and executed by a machine, the device becomes an apparatus for practicing the disclosed method.

BRIEF DESCRIPTION OF THE DRAWINGS

The invention will become more fully understood by referring to the following detailed description with reference to the accompanying drawings, wherein:

FIG. 4 is a type weighting table for interaction behaviors;

FIG. 6 shows use frequency of key terms corresponding to users;

FIG. 7 shows the interaction behaviors in the example of FIG. 5;

FIGS. 8A, 8B and 8C show relation matrices corresponding to respective concepts, respectively; and FIG. 9 shows characteristic scores for respective users regarding respective concepts.

DETAILED DESCRIPTION OF THE INVENTION

Systems and methods for measuring behavior characteristics are provided.

Figure 1:
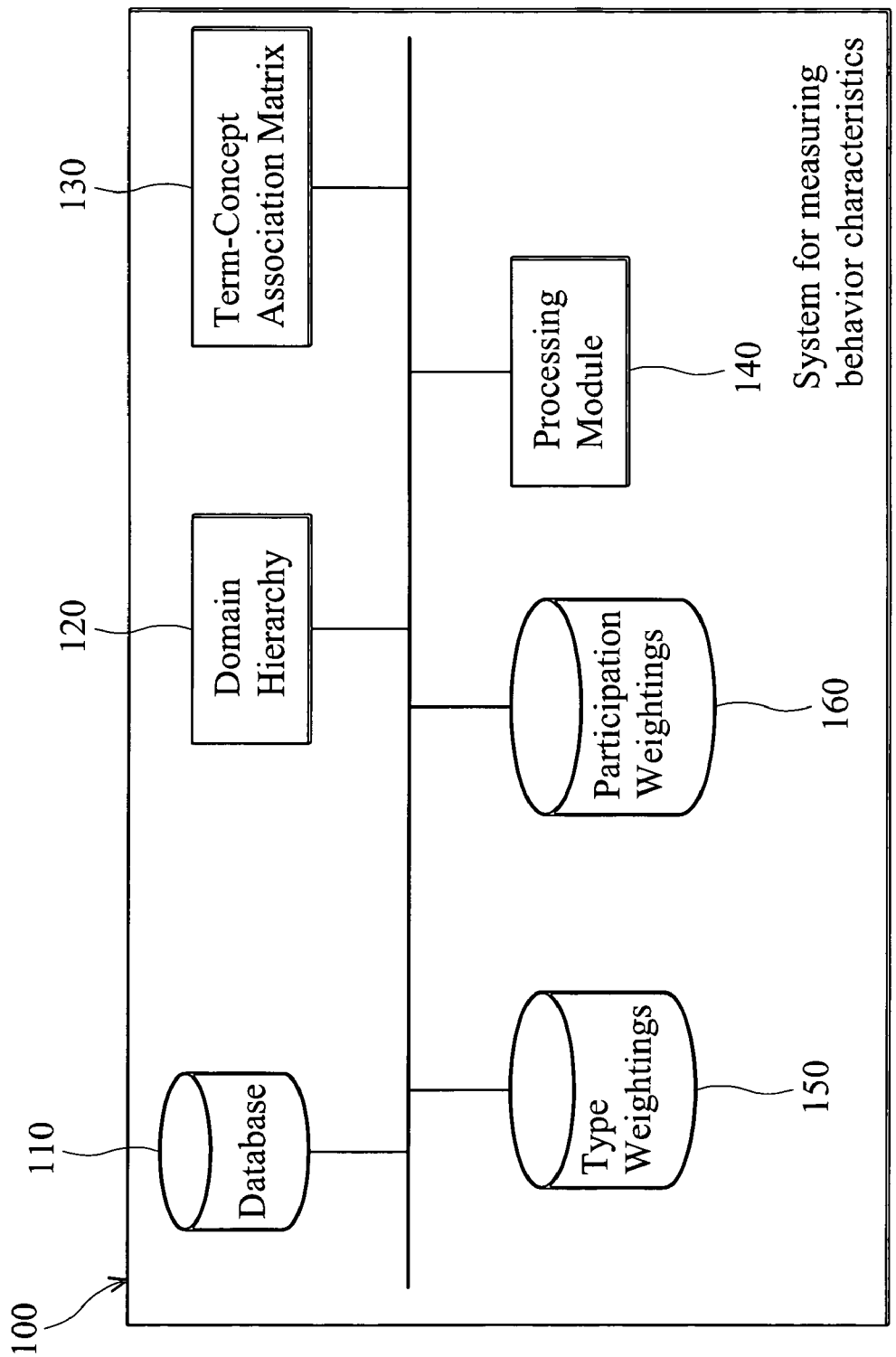
FIG. 1 is a schematic diagram illustrating an embodiment of a system for measuring behavior characteristics.

FIG. 1 illustrates an embodiment of a system for measuring behavior characteristics.

The system for measuring behavior characteristics 100 comprises a database 110, a domain hierarchy 120, a term-concept association matrix 130, and a processing module 140. It is understood that type weightings 150 corresponding to respective interaction behaviors and participation weightings 160 of interaction behaviors for characteristic score calculation can be set in the system.

Figure 2:
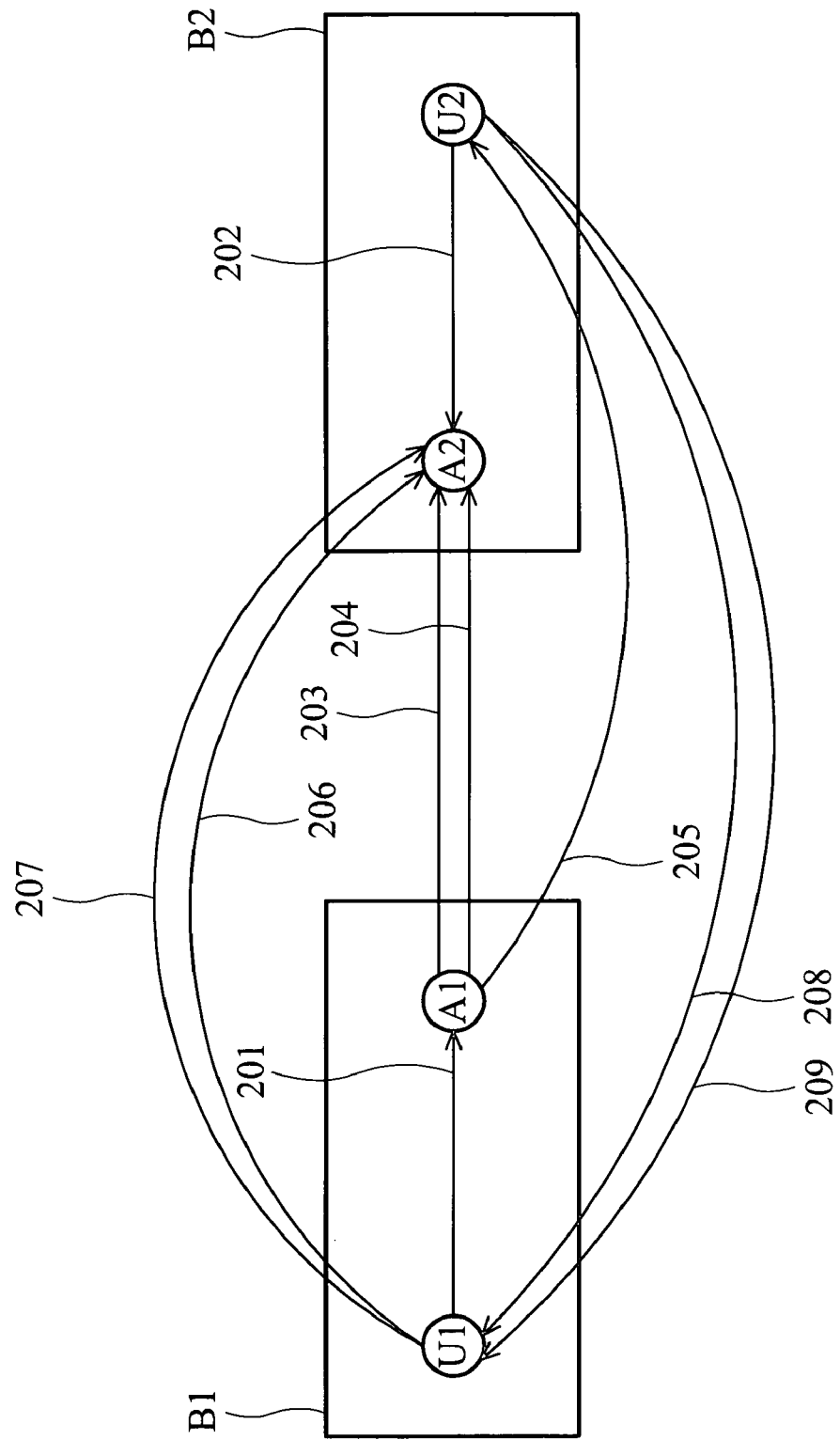
FIG. 2 is a schematic diagram illustrating an example of interaction behaviors among network content.

The database 110 stores network content for users, such as network articles in the network interaction environment, particularly, the blog environment. The network content can be fetched from the Internet via a data collection unit (not shown), or can be acquired via a data access interface provided by blog service providers. The network content comprises key terms, and interaction behaviors therebetween. The key terms may be tags and/or categories used to disclose the basic semantics of articles. Additionally, the interaction behaviors comprise comments, trackbacks, links, subscriptions, recommendations, blogrolls, and others. FIG. 2 illustrates an example of interaction behaviors among network content. As shown in FIG. 2, network content comprises blogs B1 and B2. In blog B1, user U1 publishes article A1 (201). In blog B2, user U2 publishes article A2 (202). Article A1 tracks back to article A2 (203), and links to article A2 (204). Article A1 further links to user U2 (205). Additionally, user U1 announces a comment toward article A2 (206), and recommends article A2 (207). Further, user U2 blogrolls blog B1 of user U1 in blog B2 (208), and subscribes to articles of blog B1 of user U1 (209). The articles and related key terms in the network content, and interaction behaviors between the network content can be retrieved in advance for further processing.

The domain hierarchy 120 comprises a plurality of concepts and associations therebetween. The concepts may be from an Ontology, such as DMOZ, Wordnet, or terms defined in a concept hierarchy. The term-concept association matrix 130 defines association degrees for respective key terms toward respective concepts. If m key terms and n defined concepts are provided, a m×n term-concept relation matrix M is generated, where $M_{ij}$ represents the association degree between the ith key term and the jth concept, and $0 \leq M_{ij} \leq 1$. It is understood that the term-concept association matrix 130 can be established in any manner. For example, tags and categories in network content are determined as key terms to be processed. A term association hierarchy map among the key terms is first established. The overlapping term in the term association hierarchy map and the Ontology is set as a connection point, and the association degrees of respective terms and respective concepts are calculated using related technologies of Ontology merge to obtain the term-concept association matrix 130. The processing module 140 performs the methods for measuring behavior characteristics of the invention, as discussed later.

Figure 3:
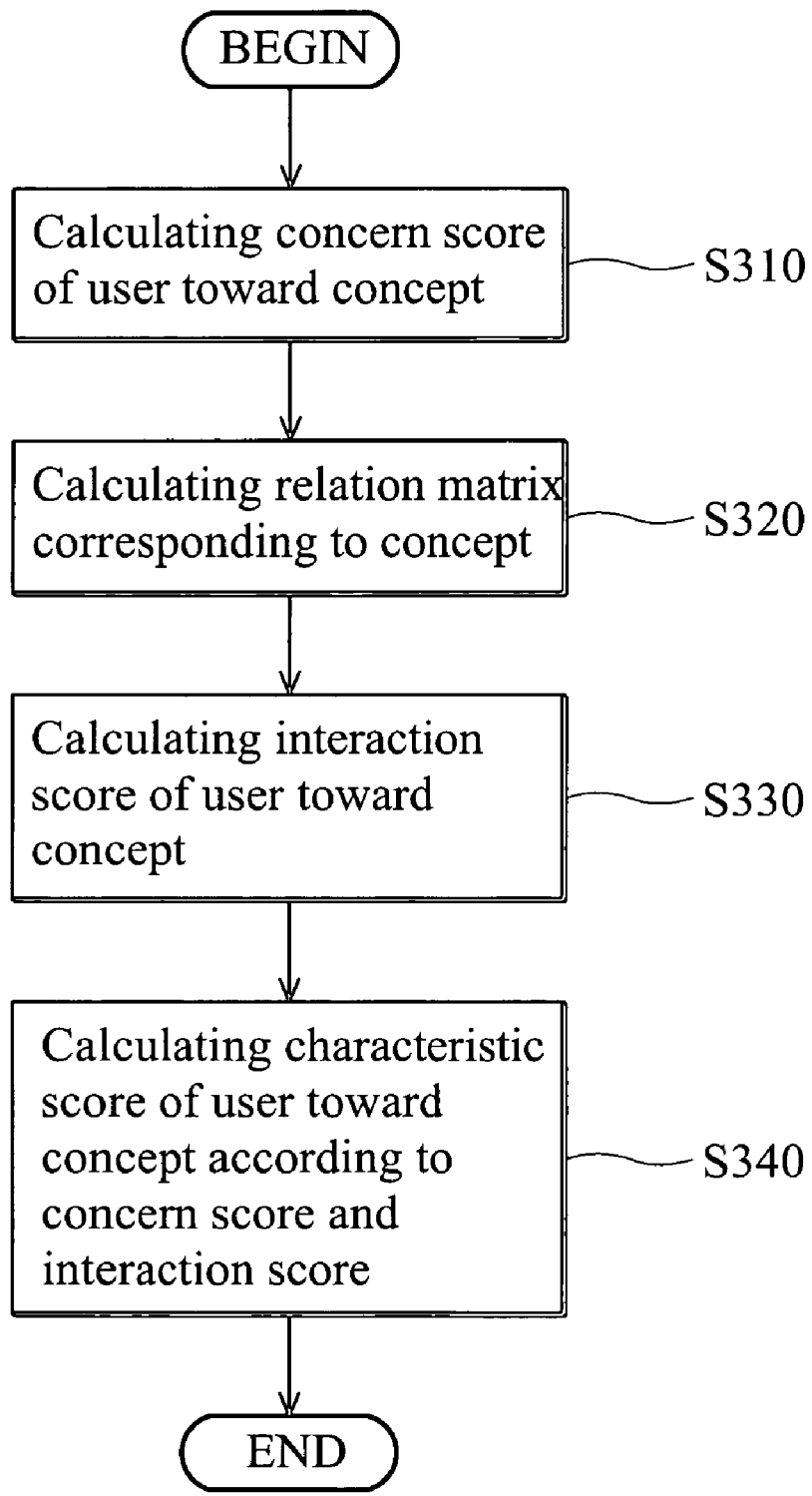
FIG. 3 is a flowchart of an embodiment of a method for measuring behavior characteristics.

FIG. 3 is a flowchart of an embodiment of a method for measuring behavior characteristics.

In step S310, for at least one specific user, a concern score for respective concepts is calculated according to use frequency of respective key terms corresponding to the specific user, use frequency of respective key terms corresponding to all users, and the term-concept relation matrix M. It is understood that while the invention can evaluate for respective users, measurement of behavior characteristics for a specific user is provided in this embodiment for explanation purposes.

In this step, a vector of use frequency for key terms $f_U = \{f_1, f_2, \ldots, f_m\}$ of length m is constructed for the specific user, where $f_i$ is the frequency of the ith key term for representing article semantics in articles published by the specific user. In other words, $f_i$ represents use frequency of the ith key term corresponding to the specific user. Additionally, a vector of use frequency for key terms $F_{ALL} = \{F_1, F_2, \ldots, F_m\}$ of length m is constructed, where $F_i$ is the frequency of the ith key term for representing article semantics in articles published by all users. In other words, $F_i$ represents use frequency of the ith key term corresponding to all users. Thereafter, the use characteristic of key terms of the specific user to all users is calculated, and the characteristic is converted to concept level to obtain a concern score vector $G_U$ for the specific user toward concepts (domains). The concern score vector $G_U$ is calculated as follows:

$$\text{if } |f_U| \neq 0, G_U = \frac{\frac{f_U}{|f_U|}}{\frac{F_{ALL}}{|F_{ALL}|}} \times M; \text{ if } |f_U| = 0, G_U \text{ is a 0 vector,}$$

where $G_U = \{G_1, G_2, \ldots, G_m\}$, and $G_j$ represents the concern score of the jth concept corresponding to the specific user.

In step S320, a relation matrix for at least one specific concept is calculated according to users corresponding to respective interaction behaviors, a type weighting corresponding to respective interaction behaviors, and association degree for key terms used in the interaction behaviors toward the specific concept. Similarly, while the invention can calculate relation matrices for respective concepts, the calculation of relation matrix for a specific concept is provided in this embodiment for explanation purposes.

As described, type weightings 150 corresponding to respective interaction behaviors can be set. FIG. 4 shows a type weighting table 400 for interaction behaviors. In this example, the behavior characteristics comprise interest, participation, specialty and popularity, and respective interaction behaviors have different type weightings for respective behavior characteristics. In this example, the type weightings of trackback to interest, participation, specialty and popularity are 0.9, 0.6, 0.9 and 0.6, respectively. The type weightings of blogroll to interest, participation; specialty and popularity are 0.4, 0.7, 0.4 and 0.7, respectively. The type weightings of link to interest, participation, specialty and popularity are 0.5, 0.7, 0.5 and 0.7, respectively. The type weightings of subscription to interest, participation, specialty and popularity are 0.8, 0.5, 0.8 and 0.5, respectively. The type weightings of comment to interest, participation, specialty and popularity are 0.4, 0.6, 0.4 and 0.6, respectively. It is understood that the type weighting table 400 is an example, and the disclosure is not limited thereto.

In this embodiment, each interaction behavior is represented as (UA, UB, S, IC). UA and UB are the two users in an interaction behavior, where UA is the user initiating the interaction behavior, and UB is the user receiving the interaction behavior. S is the type weighting of the interaction behavior. IC is a semantic concept involved in the interaction behavior, where IC is represented by (CN, AD), CN is the concept name, and AD is the association degree of key term toward the concept. It is noted that several semantic concepts may be involved in an interaction behavior. The relation matrix corresponding to a specific concept is calculated as follows:

$$R_{ij} = \sum_{\substack{UA=i \\ UB=j}} S \times AD,$$

wherein $R_{ij}$ represents interaction relation strength for the ith user toward the jth user under the specific concept.

In step S330, at least one interaction score for the specific user regarding the specific concept is calculated according to the relation matrix using an algorithm such as HITS (Hypertext-Induced Topic Search) algorithm. In this embodiment, a hub score and an authority score are obtained by HITS algorithm. In HITS algorithm, a graph relation matrix is input, and a hub value and an authority value are provided to respective nodes after processing, where the hub value represents the strength of outward connection for the node, and the authority value represents the strength of reception connection for the node. HITS algorithm is well known, and omitted herefrom. The interaction score for the specific user regarding the specific concept can be calculated according to the relation matrix corresponding to the specific concept using HITS algorithm.

In step S340, a characteristic score for the specific user regarding the specific concept is calculated according to the formula:

$B_U = G_U + k \times IA_U$, wherein $B_U$ represents the characteristic score, $G_U$ represents the concern score, $IA_U$ represents the interaction score, and k is a participation weighting for interaction behaviors. Similarly, participation weightings can be set according to respective behavior characteristics.

For interest characteristic, an interest characteristic score is calculated following the formula: $I_U = G_U + \alpha \times H_U$, where $I_U$ is the interest characteristic score, $G_U$ is the concern score, $H_U$ is the hub score in the interaction score, and $\alpha$ is the participation weighting for the whole interaction behaviors in the interest characteristic. For specialty characteristic, a specialty characteristic score is calculated following the formula: $E_U = G_U + \beta \times A_U$, where $E_U$ is the specialty characteristic score, $G_U$ is the concern score, $A_U$ is the authority score in the interaction score, and $\beta$ is the participation weighting for the whole interaction behaviors in the specialty characteristic. It is understood that, in this embodiment, the characteristic score for user toward specific concept is calculated in concept level, however, in some embodiments without the domain hierarchy and the term-concept association matrix, the characteristic score for user toward specific key term can be directly calculated in key term level.

Figure 5:
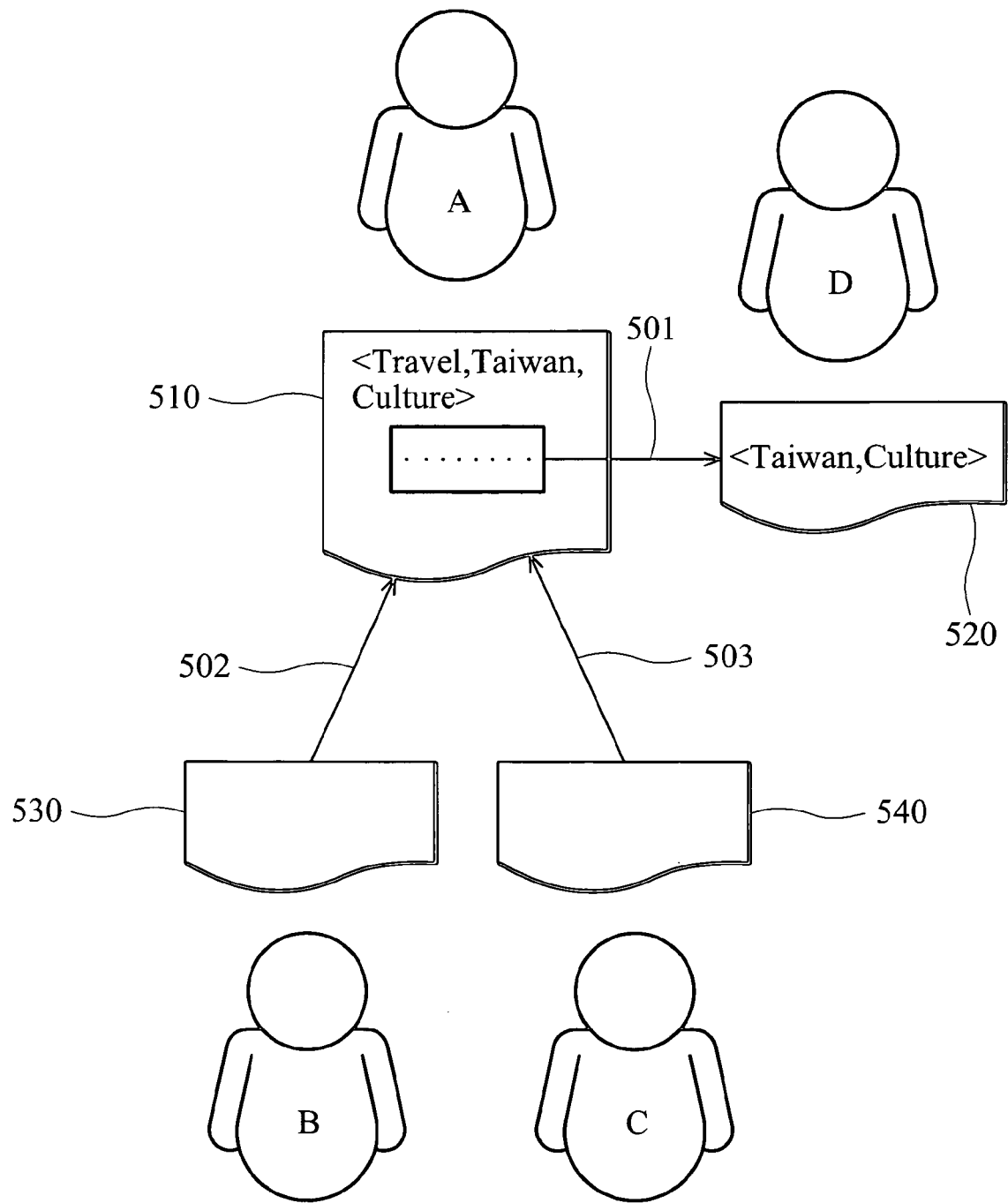
FIG. 5 shows an example of behavior characteristic measurement.

FIG. 5 shows an example of behavior characteristic measurement. As shown, user A publishes an article 510. Article 510 has key terms "Travel", "Taiwan", and "Culture", and a link (501) linking to an article 520 published by user D. Article 520 has key terms "Taiwan" and "Culture". Additionally, user B publishes an article 530 to comment (502) on article 510 published by user A. User C publishes an article 540, which references (Trackback) (503) article 510 published by user A. In this example, it is assumed that the key terms are defined concepts in the domain hierarchy.

In this example, the use frequency of key terms corresponding to respective users is shown in FIG. 6, where user A had used "Travel", "Taiwan" and "Culture" once, respectively. User D had used "Taiwan" and "Culture" once, respectively. Therefore, $f_A = (1, 1, 1)$, $|f_A| = \sqrt{3}$, $f_D = (0, 1, 1)$, $|f_D| = \sqrt{2}$, and $F_{ALL} = (1, 2, 2)$, $|F_{ALL}| = 3$, and $G_A = (1.73, 0.87, 0.87)$, $G_D = (0, 1.06, 1.06)$, and $G_B = G_C = (0, 0, 0)$ are obtained according to the formula for concern score vector $G_U$ and the term-concept relation matrix M.

Figure 8C:
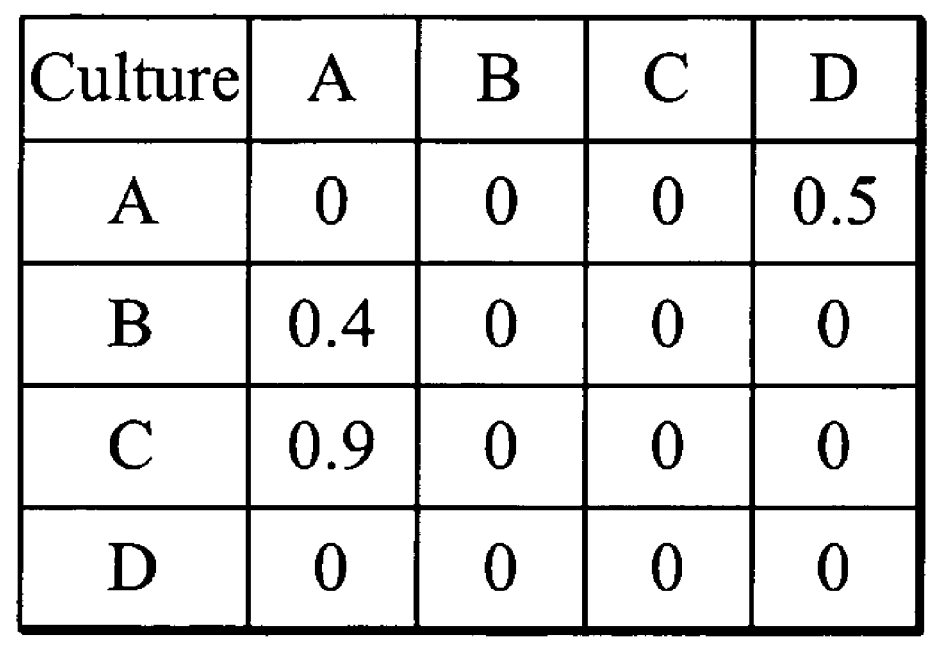

Interaction behaviors in FIG. 5 are shown in FIG. 7. Relation matrices corresponding to "Travel", "Taiwan" and "Culture" are generated according to the interaction behaviors in FIG. 7, and respectively shown in FIGS. 8A, 8B and 8C. Thereafter, interaction score vectors corresponding to respective relation matrices are respectively calculated according to the relation matrices in FIGS. 8A, 8B and 8C using HITS algorithm, where the authority score vector and hub score vector corresponding to the relation matrix in FIG. 8A are $A = (1, 0, 0, 0)$ and $H = (0, 1, 2.25, 0)$, the authority score vector and hub score vector corresponding to the relation matrix in FIG. 8B are $A = (1, 0, 0, 0)$ and $H = (0, 1, 2.25, 0)$, and the authority score vector and hub score vector corresponding to the relation matrix in FIG. 8C are $A = (1, 0, 0, 0)$ and $H = (0, 0, 1, 0)$. It is noted that the representation of the interaction score vector is the interaction scores of respective users toward a specific concept. Finally, the characteristic scores of respective users toward respective concepts are obtained according to the concern scores and the interaction scores, as shown in FIG. 9. It is understood that the participation weightings for respective behavior characteristics are both 0.5 in this example.

The invention measures behavior characteristics of users according to semantics and interaction behaviors in an interactive network environment. Service providers can develop and provide related enhanced application based on characteristic scores of users toward respective concepts.

Systems and methods for measuring behavior characteristics, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine, such as a computer, the device thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer, the device becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the invention shall be defined and protected by the following claims and their equivalents.

What is claimed is:

1. A system for measuring behavior characteristics stored in a non-transitory machine-readable storage medium, comprising:
    a domain hierarchy comprising a plurality of concepts and associations therebetween;
    a database storing network content for a plurality of users, where the network content comprises a plurality of key terms, and a plurality of interaction behaviors therebetween, wherein each of the interaction behaviors involves at least two users, and has a corresponding type weighting, in which different interaction behaviors have different type weightings;
    a term-concept association matrix recording association degrees for respective key terms toward respective concepts; and
    a processing module, for at least one specific user, calculating a concern score for respective concepts according to use frequency of respective key terms corresponding to the specific user, use frequency of respective key terms corresponding to all users, and the term-concept association matrix, calculating a relation matrix for at least one specific concept according to the at least two users corresponding to respective interaction behaviors, the type weighting corresponding to respective interaction behaviors, and the association degree for at least one key term used in the interaction behaviors toward the specific concept, calculating an interaction score for the specific user regarding the specific concept according to the relation matrix using an algorithm, and calculating a characteristic score for the specific user regarding the specific concept according to the concern score and the interaction score,
    wherein the processing module calculates the relation matrix according to the formula, wherein "x" in the formula means a cross product:

$$R_{ij} = \sum^{UA=i}_{UB=j} S \times AD,$$

wherein $R_{ij}$ represents interaction relation strength for the ith user toward the jth user under the specific concept, respective interaction behavior is represented by (UA, UB, S, AD), where UA and UB represents two users corresponding to one interaction behavior, S represents the type weighting corresponding to the interaction behavior, and AD represents the association degree for the key term used in the interaction behavior toward the specific concept.

2. The system of claim 1 wherein the network content comprises a plurality of network articles.

3. The system of claim 2 wherein the key terms comprise at least a tag or category of respective network articles.

4. The system of claim 2 wherein the interaction behaviors comprise comments, trackbacks, links, subscriptions, recommendations or blogrolls.

5. The system of claim 1 wherein the processing module calculates the concern score according to the formula, wherein "x" in the formula means a cross product:

$$G_U = \frac{\frac{f_U}{|f_U|}}{\frac{F_{ALL}}{|F_{ALL}|}} \times M$$

wherein $G_U = \{G_1, G_2, \ldots, G_m\}$, $G_j$ represents the concern score for the specific user regarding the jth concept, $f_U = \{f_1, f_2, \ldots, f_m\}$, $f_i$ represents the use frequency of the ith key term corresponding to the specific user, $F_{ALL} = \{F_1, F_2, \ldots, F_m\}$, $F_i$ represents the use frequency of the ith key term corresponding to all users, and M represents the term-concept association matrix.

6. The system of claim 1 wherein the algorithm comprises a HITS (Hypertext-Induced Topic Search) algorithm.

7. The system of claim 6 wherein the processing module calculates the characteristic score according to the formula, wherein "x" in the formula means a cross product:

$$B_U = G_U + k \times IA_U,$$

wherein $B_U$ represents the characteristic score, $G_U$ represents the concern score, $IA_U$ represents the interaction score, and k is a participation weighting for the interaction behaviors.

8. The system of claim 7 wherein the interaction score comprises a hub score or an authority score.

9. A computer-implemented method for measuring behavior characteristics for use in a computer, wherein the computer is programmed to perform the steps of:
providing a domain hierarchy comprising a plurality of concepts and associations therebetween;
providing network content for a plurality of users, where the network content comprises a plurality of key terms, and a plurality of interaction behaviors therebetween, wherein each of the interaction behaviors involves at least two users, and has a corresponding type weighting, in which different interaction behaviors have different type weightings;
providing a term-concept association matrix recording association degrees for respective key terms toward respective concepts;
for at least one specific user, calculating a concern score for respective concepts according to use frequency of respective key terms corresponding to the specific user, use frequency of respective key terms corresponding to all users, and the term-concept association matrix;
calculating a relation matrix for at least one specific concept according to the at least two users corresponding to respective interaction behaviors, the type weighting corresponding to respective interaction behaviors, and the association degree for at least one key term used in the interaction behaviors toward the specific concept;
calculating an interaction score for the specific user regarding the specific concept according to the relation matrix using an algorithm; and
calculating a characteristic score for the specific user regarding the specific concept according to the concern score and the interaction score,
wherein the relation matrix is calculated according to the formula, wherein "x" in the formula means a cross product:

$$R_{ij} = \sum^{UA=i}_{UB=j} S \times AD,$$

wherein $R_{ij}$ represents interaction relation strength for the ith user toward the jth user under the specific concept, respective interaction behavior is represented by (UA, UB, S, AD), where UA and UB represents two users corresponding to one interaction behavior, S represents the type weighting corresponding to the interaction behavior, and AD represents the association degree for the key term used in the interaction behavior toward the specific concept.

10. The method of claim 9 wherein the network content comprises a plurality of network articles.

11. The method of claim 10 wherein the key terms comprise at least a tag or category of respective network articles.

12. The method of claim 10 wherein the interaction behaviors comprise comments, trackbacks, links, subscriptions, recommendations or blogrolls.

13. The method of claim 9 further comprising calculating the concern score according to the formula, wherein "x" in the formula means a cross product:

$$G_U = \frac{\frac{f_U}{|f_U|}}{\frac{F_{ALL}}{|F_{ALL}|}} \times M,$$

wherein $G_U = \{G_1, G_2, \ldots, G_m\}$, $G_j$ represents the concern score for the specific user regarding the jth concept, $f_U = \{f_1, f_2, \ldots, f_m\}$, $f_i$ represents the use frequency of the ith key term corresponding to the specific user, $F_{ALL} = \{F_1, F_2, \ldots, F_m\}$, $F_i$ represents the use frequency of the ith key term corresponding to all users, and M represents the term-concept association matrix.

14. The method of claim 9 wherein the algorithm comprises a HITS (Hypertext-Induced Topic Search) algorithm.

15. The method of claim 14 further comprising calculating the characteristic score according to the formula, wherein "x" in the formula means a cross product:

$$B_U = G_U + k \times IA_U,$$

wherein $B_U$ represents the characteristic score, $G_U$ represents the concern score, $IA_U$ represents the interaction score, and k is a participation weighting for the interaction behaviors.

16. The method of claim 15 wherein the interaction score comprises a hub score or an authority score.

17. A non-transitory machine-readable storage medium comprising a computer program, which, when executed, causes a device to perform a method for measuring behavior characteristics, the method comprising:
  providing a domain hierarchy comprising a plurality of concepts and associations therebetween;
  providing network content for a plurality of users, where the network content comprises a plurality of key terms, and a plurality of interaction behaviors therebetween, wherein each of the interaction behaviors involves at least two users, and has a corresponding type weighting, in which different interaction behaviors have different type weightings;
  providing a term-concept association matrix recording association degrees for respective key terms toward respective concepts;
  for at least one specific user, calculating a concern score for respective concepts according to use frequency of respective key terms corresponding to the specific user, use frequency of respective key terms corresponding to all users, and the term-concept association matrix;
  calculating a relation matrix for at least one specific concept according to the at least two users corresponding to respective interaction behaviors, the type weighting corresponding to respective interaction behaviors, and the association degree for at least one key term used in the interaction behaviors toward the specific concept;
  calculating an interaction score for the specific user regarding the specific concept according to the relation matrix using an algorithm; and
  calculating a characteristic score for the specific user regarding the specific concept according to the concern score and the interaction score,
  wherein the relation matrix is calculated according to the formula, wherein "x" in the formula means a cross product:

$$R_{ij} = \sum_{\substack{UA=i \\ UB=j}} S \times AD,$$

wherein $R_{ij}$ represents interaction relation strength for the ith user toward the jth user under the specific concept, respective interaction behavior is represented by (UA, UB, S, AD), where UA and UB represents two users corresponding to one interaction behavior, S represents the type weighting corresponding to the interaction behavior, and AD represents the association degree for the key used in the interaction behavior toward the specific concept.

* * * * *